United States Patent
Bafna et al.

(10) Patent No.: US 11,711,016 B2
(45) Date of Patent: Jul. 25, 2023

(54) POWER REGULATOR WITH VARIABLE RATE INTEGRATOR

(71) Applicant: Texas Instruments Incorporated, Dallas, TX (US)

(72) Inventors: Naman Bafna, Balaghat (IN); Preetam Charan Anand Tadeparthy, Bangalore (IN); Ammineni Balaji, Pulivendula (IN); Sreelakshmi Suresh, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 79 days.

(21) Appl. No.: 17/489,782

(22) Filed: Sep. 30, 2021

(65) Prior Publication Data

US 2023/0079601 A1  Mar. 16, 2023

Related U.S. Application Data (60) Provisional application No. 63/244,027, filed on Sep. 14, 2021.

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05)

(58) Field of Classification Search
CPC ............................ H02M 3/158; H02M 1/0025
See application file for complete search history.

(56) References Cited

U.S. PATENT DOCUMENTS 5,298,845 A * 3/1994 DeBoer ................. G05B 5/01
                                                  318/609
9,160,250 B2  10/2015 Chen
(Continued)

FOREIGN PATENT DOCUMENTS

| EP | 1376837 A1 | 1/2004 |
|---|---|---|
| JP | 2019-129610 A | 8/2019 |
| KR | 10-2017-0098033 A | 8/2017 |

OTHER PUBLICATIONS

"TPS53689 Dual-channel (N+M=8 phase) D-Cap+, Step-down, Multiphase Controller with PMBus and VR14 SVVID Interfaces", TPS53689, Texas Instruments Incorporated, Jun. 2021, pp. 1-7.
(Continued)

*Primary Examiner* — Adolf D Berhane
*Assistant Examiner* — Afework S Demisse
(74) *Attorney, Agent, or Firm* — Charles F. Koch; Frank D. Cimino (57) ABSTRACT

In described examples of a system having a proportional-integral control module, an error signal is produced that is indicative of a difference between a reference signal and an output signal. An integral control signal is produced by integrating the error signal using an integrator time constant value. During a steady state condition, a first integrator time constant value is used. When an undershoot in the output signal is detected, the integrator time constant value is increased to a second time constant value that is larger than the first integrator time constant value during the undershoot condition. The integrator time constant value is reduced to a third integrator time constant value that is less than the first integrator time constant value during a period following the undershoot condition.

20 Claims, 8 Drawing Sheets

(56) References Cited

U.S. PATENT DOCUMENTS

2014/0354250 A1   12/2014  Deng
2019/0131872 A1*  5/2019  Cheng .................. H02M 3/157

OTHER PUBLICATIONS

"Buck Converter", Wikipedia, available at https:/en.wikipedia.org/w/index.php?title=Buck_converter&oldid=1031138280 an Jun. 30, 2021, pp. 1-17.
"PID Controller", Wikipedia, available at https://en.wikipedia.org/w/index.php?title=PID_controller&oldid=1042137171 on Sep. 3, 2021, pp. 1-27.
Carmen Parisi, Multiphase Buck Design from Start to Finish (Part 1), Application Report, Texas Instruments, Incorporated, Apr. 2017, Revised Apr. 2021, pp. 1-19.
PCT International Search Report dated Jan. 4, 2023.
English translation of JP2019129610A, Aug. 1, 2019.
English translation of KR1020170098033A, Aug. 29, 2017.

* cited by examiner

POWER REGULATOR WITH VARIABLE RATE INTEGRATOR

CROSS-REFERENCE TO RELATED APPLICATION

This application claims priority to U.S. Provisional Patent Application No. 63/244,027 filed Sep. 14, 2021, the entirety of which is incorporated herein by reference.

TECHNICAL FIELD

This relates to a variable rate integrator for use in control loops, such as in a power regulator.

BACKGROUND

A buck converter is a DC-to-DC power converter which steps down voltage from its input (supply) to its output (load). A boost converter is a DC-to-DC power converter that steps up voltage (while stepping down current) from its input (supply) to its output (load). Each type is a class of switched-mode power supply (SMPS) typically containing a semiconductor switching device and at least one energy storage element, such as a capacitor, inductor, or the two in combination. To reduce voltage ripple, filter capacitors are normally added to such a converter's output (load-side filter) and/or input (supply-side filter).

Switching converters provide much greater power efficiency as DC-to-DC converters than linear regulators, which are simpler circuits that reduces a voltage by dissipating power as heat. Buck converters can be highly efficient (often higher than 90%).

A feedback control loop monitors the output voltage and controls the switching rate and/or switching frequency to maintain the output voltage at a target value. Typically, a pulse width modulation (PWM) technique is used to control the cycle time of the switches and thereby regulate the output voltage.

SUMMARY

In described examples of a system having a proportional-integral control module, an error signal is produced that is indicative of a difference between a reference signal and an output signal. An integral control signal is produced by integrating the error signal using an integrator time constant value. During a steady state condition, a first integrator time constant value is used. When an undershoot in the output signal is detected, the integrator time constant value is increased to a second time constant value that is larger than the first integrator time constant value during the undershoot condition. The integrator time constant value is reduced to a third integrator time constant value that is less than the first integrator time constant value during a period following the undershoot condition. The integrator time constant is then returned to the first integrator time constant value for steady state operation.

DETAILED DESCRIPTION

In the drawings, like elements are denoted by like reference numerals for consistency.

Multiphase buck regulators used to power server, graphics processing units (GPUs), ethernet switches etc. may have very stringent load regulation requirements. In order to take care of transients that occur during operation of the servers, etc., power supply regulators are built with a control loop that includes a proportional path along with an integrator path to ensure rapid DC settling after a transient. When the regulator is hit with a transient there is a huge difference between the regulation point and the output voltage. In these cases, the control loop usually sees a large signal swing and the proportional path quickly brings the output voltage close to a regulation point based on the proportional path gain. The slower integrator path then comes in to settle the output slowly to the final regulation point.

However, there are problems with this approach. While the proportional fast path is in operation the integrator path is unnecessarily absorbing a lot of error. If the load is released at this point, then the integrator might ask the loop to give an unnecessary pulse width modulation (PWM) pulse which can cause an overshoot. Furthermore, the settling from the initial proportional path regulation point is dependent on the integrator time constant and can be extremely slow.

In described examples, an integrator management technique to reduce the integrator drifts during undershoots and also to settle the output voltage faster from the initial proportional path settling point to the final DC settling point will be described. In described examples, integrator drifts are reduced by increasing the integrator time constant during undershoot. Then, the settling time from proportional path settling to the DC settling is reduced by decreasing the integrator time constant for a defined amount time. This time is based on the inductor and output filter capacitor configuration. In some examples, the amount of time is programmable based on a number of PWM pulses. In other words, the integrator will be placed in a low time constant mode until "N" number of PWM pulses occur.

Figure 1:
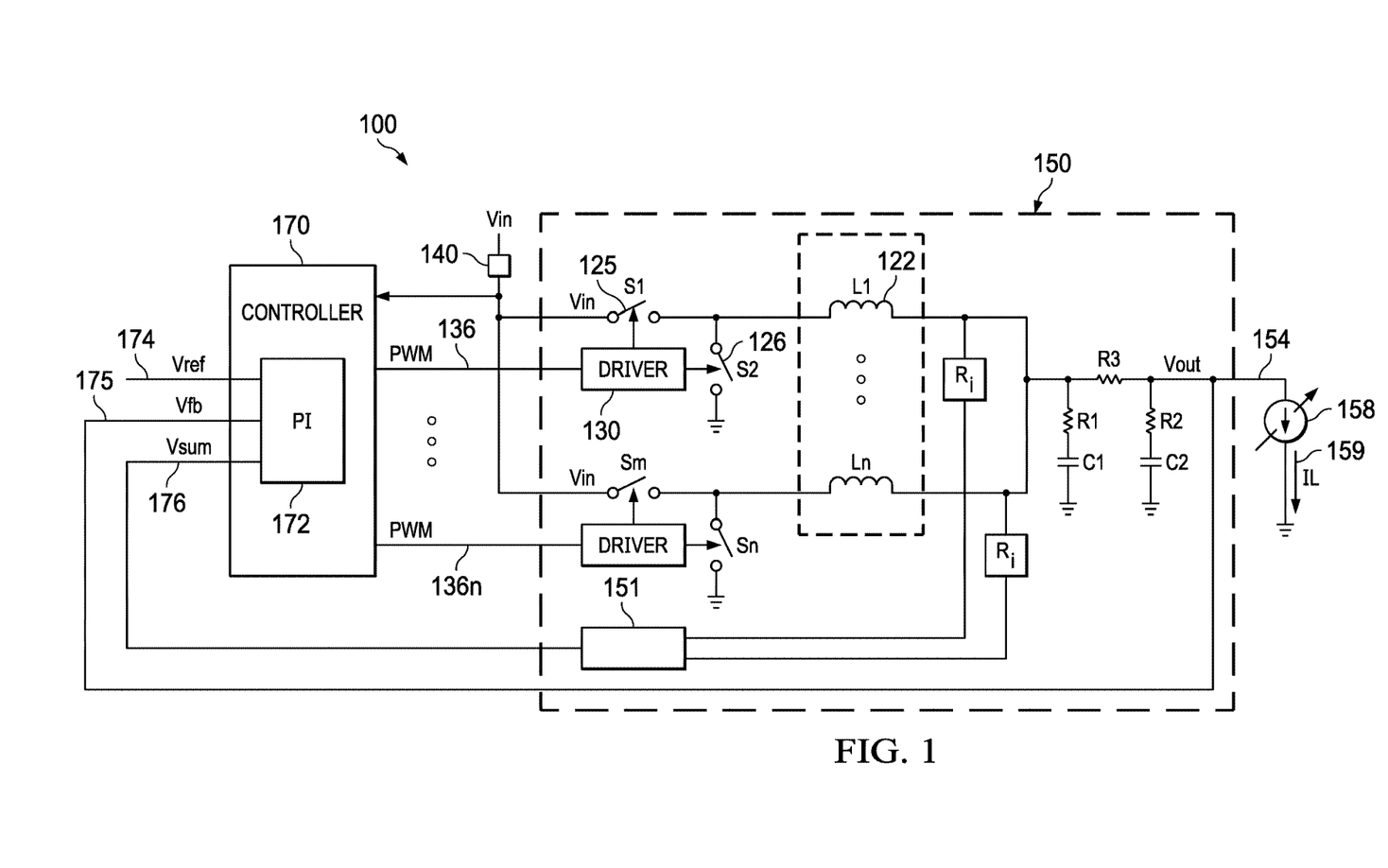
FIG. 1 is a block diagram of an example buck converter power regulator that includes a variable rate integrator.

FIG. 1 is a diagram of an example regulator system 100 that uses a proportional-integral (PI) control loop circuitry 170 to maintain an output voltage Vout 154 within a required range of values in response to a time varying load 158. PI control loop circuitry 170 includes a variable rate integrator that has a variable time constant, as will be described in more detail below. In this example, the PI control circuit 170 includes a comparator that compares a feedback voltage (Vfb) 175 with a target reference voltage (Vref) 174, where Vref is provided by a Vref source (not shown) and Vfb is provided by a feedback loop that connects to the output node 154. Vfb 175 is representative of an output voltage (Vout) provided on output node 154 Also, the PI control circuitry 170 accounts for variations in load current 159, where the load current is indicated by a voltage (Vsum) 176 that is provided by current sense summing circuit 151.

As shown, the regulator system 100 includes a multi-phase switching converter circuitry 150 and a control circuit 170 that generates PWM control signals 136 that are coupled to control driver circuitry 130 that produces PWM pulses for one or more power switches (e.g., 125, 126) of the converter switching circuitry 150. In this example, the converter switching circuitry 150 corresponds to a buck converter topology, where switch 125 is a high-side switch and switch 126 is a low-side switch. The switching circuitry 150 also includes output inductors (L1, Ln) 122, and output filter capacitors (C1, C2). In other examples, the switching circuitry 150 could have a boost converter topology, or another switching topology.

In this example, a multi-phase switching topology is illustrated, as indicated by additional phase circuitry switches Sm, Sn, control signals 136n, and inductors Ln. The general operation of multiphase switching techniques is known, see for example "Multiphase Buck Design From Start to Finish (Part 1)," SLVA882B, Revised April 2021.

Figure 2:
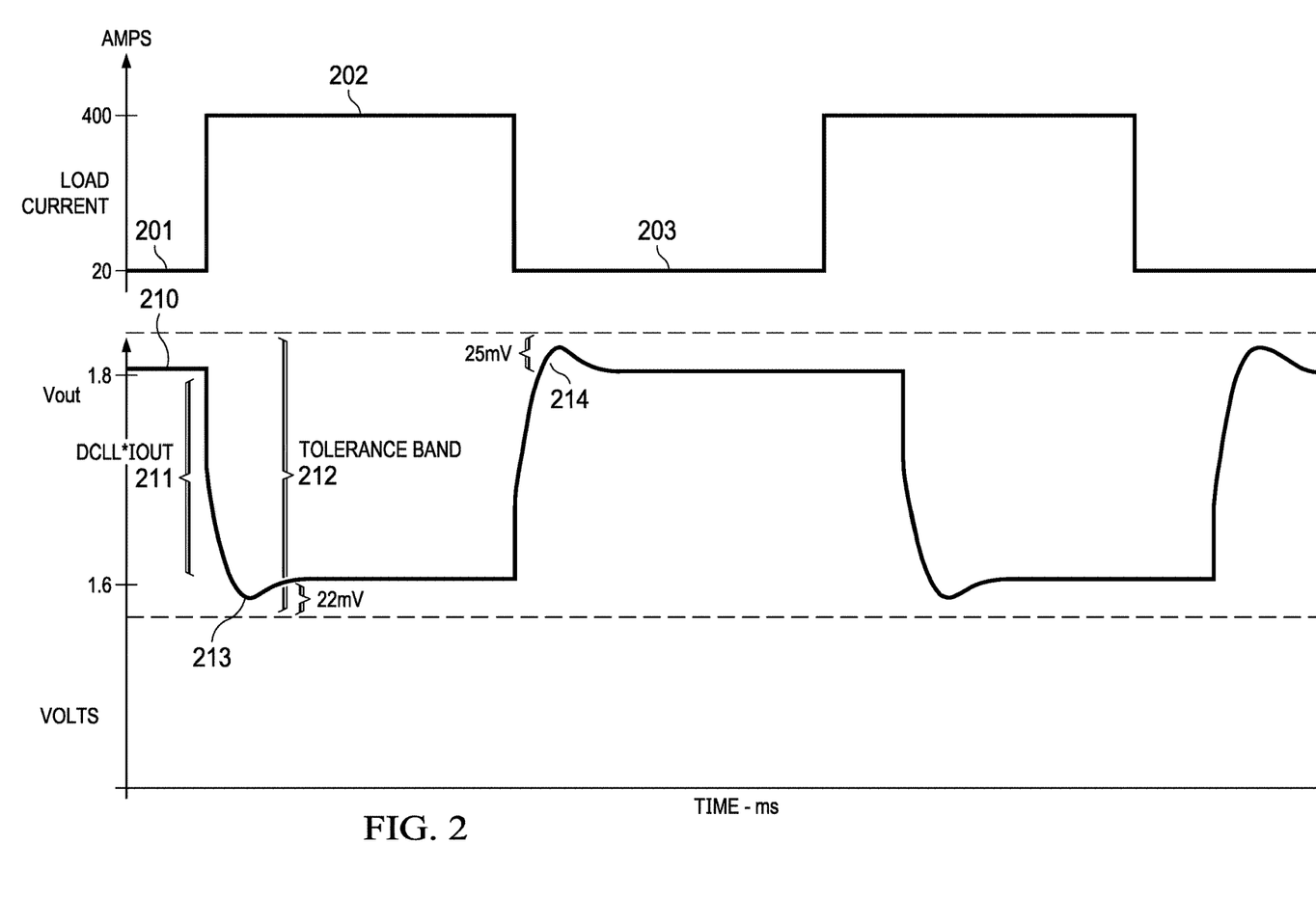
FIG. 2 is a plot illustrating an example regulator performance requirement.

FIG. 2 is a plot illustrating an example regulator performance requirement. In this example, a system requirement is to provide a supply current 201 at up to 400 amps with a duty cycle 202, 203 of 10%-90% with a slew rate of 1000 A/µs while maintaining a supply voltage 210 at 1.8V within a tolerance band of approximately 0.2 volts, as indicated at 212. A maximum undershoot 213 of 22 mV and a maximum overshoot 214 of 25 mV is allowed in this example. The regulator must maintain output voltage 210 within a range of DCLL*IOUT as indicated at 211, where DCLL represents an allowable output impedance, which in this example is approximately 0.5 mOhm. Therefore, in this example, for a load of 400 A, then DCLL*Iout will be 200 mV. In this example, a total tolerance band 212 in the amount of 200 mV+25 mV+22 mV including undershoot/overshoot must be maintained. Therefore, for a reference voltage of 1.8V, Vout must be maintained at 1.8V+25 mV-1.6V-22 mV, as shown at 212.

Figure 3:
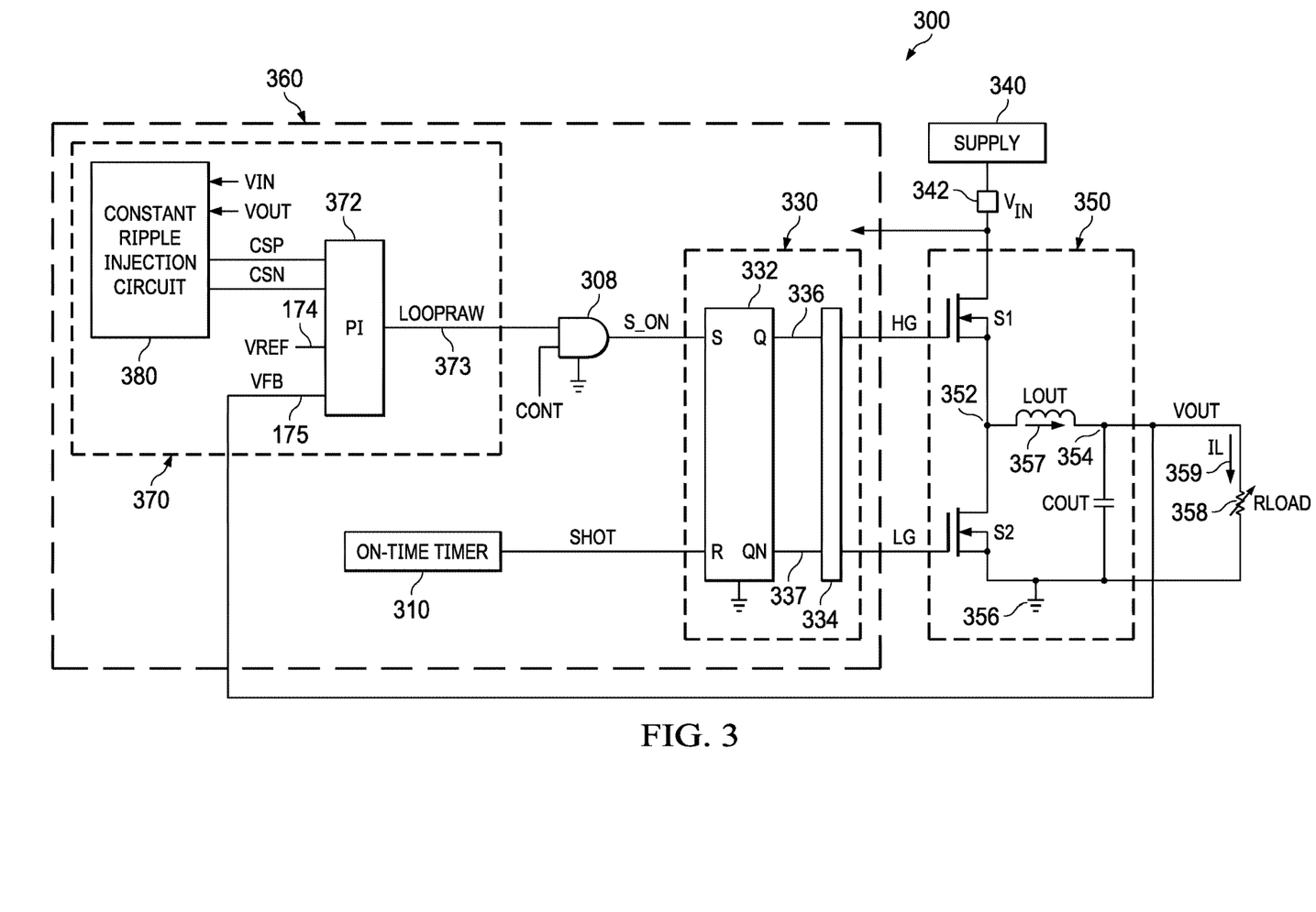
FIG. 3 is a more detailed block diagram of a portion an example buck converter system.

FIG. 3 is a more detailed block diagram of a portion of another example buck converter system 300. This example is a single-phase regulator; however, it is also representative of one phase of multiphase regulator system 100 of FIG. 1. Regulator system 300 includes switching converter circuitry 350 and a control circuit 360 for one or more power switches (e.g., S1 or S2) of the switching converter circuitry 350. In this example, the switching converter circuitry 350 corresponds to a buck converter topology, where S1 is a high-side switch and S2 is a low-side switch. The switching converter circuitry 350 also includes an output inductor (LOUT), and an output capacitor (COUT). In other examples, the switching converter circuitry 350 could have a boost converter topology, or another switching converter topology.

In this example, a power supply 340 is coupled to Vin node 342. Switches S1 and S2 are coupled between Vin input node 342 and a ground node 356. One end of inductor LOUT is coupled to a switch node 352 between S1 and S2. An opposite end of inductor LOUT is coupled to an output node 354. Filter capacitor COUT and a variable load (RLOAD) 358 are coupled in parallel between the output node 354 and the ground node 356. In a first state (S1 on, S2 off) of the switching converter circuitry 350, the inductor current 357 ramps up. In a second state (S1 off, S2 on), inductor current 357 ramps down. To regulate VOUT at the output node 354, the timing of the first and second states is controlled by the control circuit 360. As the load current (IL) 359 increases in response to a change in the variable load 358, output voltage Vout tends to fall and control circuit 360 adjusts the timing of the first and second states to account for this change. For example, the length of the first state time may be increased subject to certain limits such as a minimum off-time.

In this example, the timing of the first state and the second state are a function of various signals including a first control signal (LoopRaw) output from a proportional-integral (PI) loop control circuit 372 and a second control signal (SHOT) output from an on-time timer circuit 310. LoopRaw indicates when to turn S1 on (i.e., LoopRaw is used to generate a switch on signal, S_ON). Meanwhile, SHOT indicates when to turn S1 off. More specifically, S_ON is output from an AND gate 308 that receives LoopRaw and a minimum off-time signal (CONT) to ensure S_ON is off for a minimum off-time. Thus, when LoopRaw and CONT are high, S_ON is high. Otherwise, when either or both of LoopRaw or CONT are low, S_ON is low. In some examples, CONT is provided by a minimum off-time signal generator (not shown). Often the minimum off-time is a fixed value for a given product. When the minimum off-time of the low-side switch arrives, CONT is asserted.

In the example of FIG. 3, S_ON is provided to a latch 332. Latch 332 is part of a switch driver circuit 330 configured to provide a high-side gate drive signal (HG) to S1 and to provide a low-side gate drive signal (LG) to S2. For example, the Q and QN outputs of the latch 332 can be provided to the driver circuit 334, which is configured to provide sufficient current to drive S1 and S2. Thus, when the latch 332 receives S_ON, the switch driver circuit 330 directs the switching converter circuitry 350 to transition to state 2 (S1 off, S2 on). In some examples, the latch 332 is an SR latch with a set (S) input node and a reset (R) input node, where the R input node is configured to receive SHOT from the on-time timer circuit 310. In this manner, a pulse width modulated signals 336, 337 are formed and provided to driver circuit 334.

In the example of FIG. 3, the PI control circuit 370 includes a comparator that compares a feedback voltage (VFB) with a target reference voltage (VREF), where VREF is provided by a VREF source (not shown) and VFB is provided by a feedback loop that connects to the output node 354. Also, the PI control circuitry 372 accounts for variations in load current, where the load current is indicated by current source positive (CSP) and current source negative (CSN) provided by a constant ripple injection circuit 380 coupled to the PI control 372. In operation, the PI control 372 uses CSP and CSN as a ripple injection to adjust VFB. More specifically, CSP and CSN are used to generate a zero to compensate the double pole generated by LOUT and COUT. Otherwise, the control loop may be unstable. In this example, inputs to the constant ripple injection circuit 380 include VIN and VOUT, or at least values proportional to VIN and VOUT.

Figure 4:
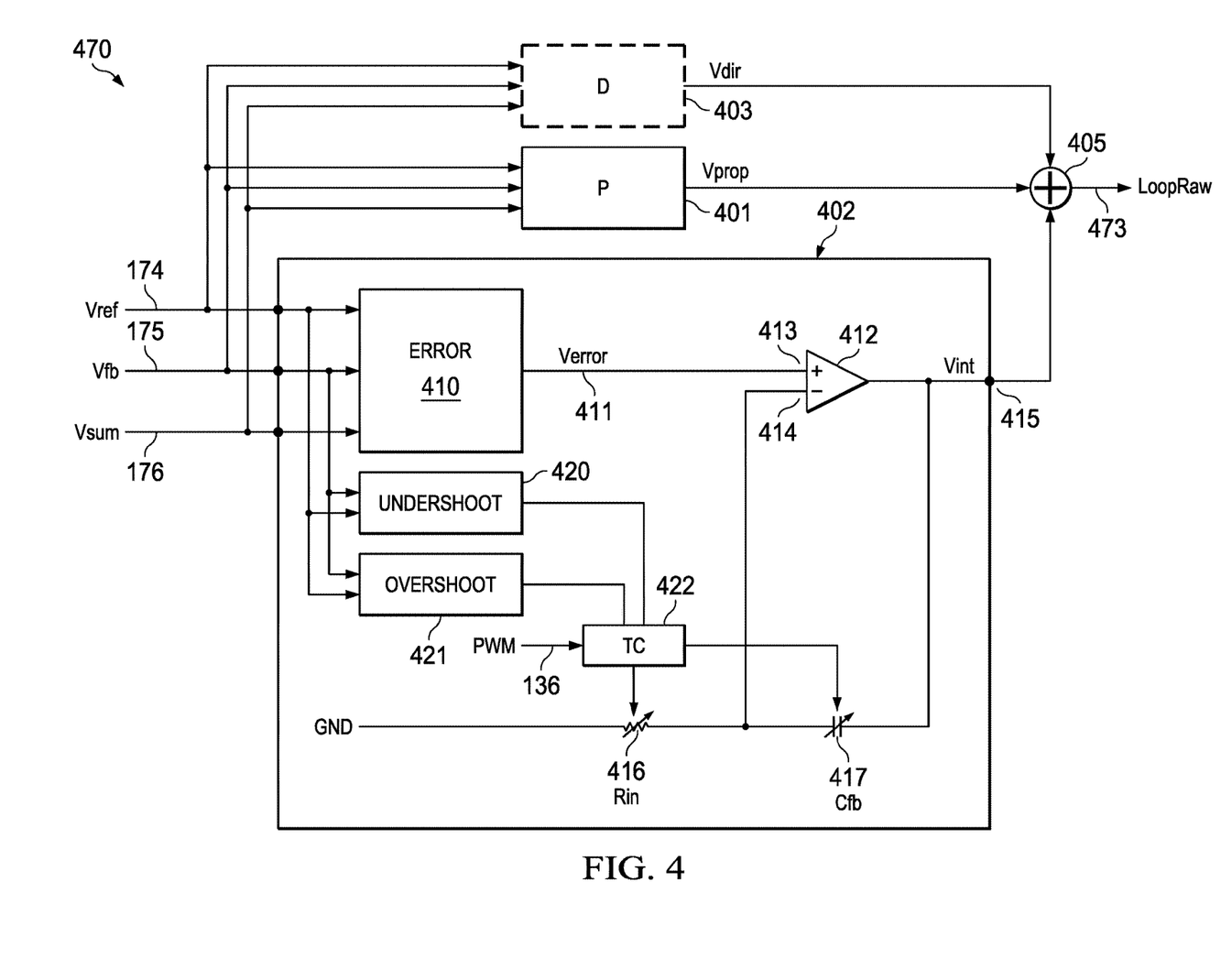
FIG. 4 is a schematic illustrating an example integrator circuit.

FIG. 4 is a schematic illustrating an example PI control circuit 470 that includes variable rate integral control circuit 402. PI circuit 470 is representative of PI circuit 170 (FIG. 1) and PI circuit 372 (FIG. 3). PI circuit 470 includes a proportional control block 401 and a variable rate integrating control block 402 that are coupled to a reference voltage signal Vref 174, a feedback voltage signal Vfb 175, and a voltage signal Vsum 176 that is representative of a summation of current sense signals produced in the multiple phases of the switching circuitry, such as switching circuitry 150 in FIG. 1 and switching circuitry 350 in FIG. 3.

In some examples, a derivative control block 403 is also included. In that case, control circuit 470 is referred to as a proportional, integral, derivative (PID) controller. The general operation of PI and PID controllers is known, see, for example, "PID Controller," Wikipedia, September 2021.

Proportional control block 401 provides a fast proportional path to ensure good transient response to changes in Vout produced by load changes. Integral block 402 ensure the output voltage quickly settles within the tolerance band after a load change.

Integral control block 402 includes an error signal summing circuit 410 that applies a selected weighting to the Vref 174, Vfb 175, and Vsum 176 input signals to generate an error signal (Verror) 411 that is indicative of a difference between output signal Vout 154 (FIG. 1) or Vout 354 (FIG. 3) and the Vref signal. Similarly, the proportional and derivative control blocks may include error signal summing circuits that use different weighting criteria to generate output signals Vprop, Vdir, respectively.

Opamp circuit 412 has a non-inverting input 413 coupled to error signal 411 produced by summing circuit 410. An inverting input 414 is coupled to a terminal of resistive element (Rin) 416 and capacitive feedback element (Cfb) 417. Another terminal of resistive element 416 is coupled to a fixed voltage ground node. In this manner, opamp 412 integrates the error signal Verror 411 over time to produce integrator output signal Vint, which is also the integral control block output 415. PID control signals Vint, Vprop, and Vdir are then combined by summing block 405 to form control signal LoopRaw that is then used to control the switching circuitry, as described above.

The gain of integrator block 412 is given by expression (1), assuming ideal conditions of no leakage. The term "Rin*C is referred to as the "integrator time constant."

$$V_{out} = -\frac{1}{R_{in}C}\int_0^\tau V_{in}dt = -\int_0^\tau V_{in}\frac{dt}{R_{in}C} \quad (1)$$

According to expression (1), the gain of integrator block 412 can be changed by changing the value of either or both input resistor (Rin) 416 and feedback capacitor (Cfb) 417.

In described examples, integrator drifts are reduced by increasing the integrator time constant during an undershoot condition on feedback signal Vfb 175 detected by undershoot detection circuitry 420. Feedback signal 175 tracks Vout 154 (FIG. 1) or Vout 354 (FIG. 3). Then, the settling time from proportional path settling to the DC settling is reduced by decreasing the integrator time constant for a defined amount time. This time is based on the inductor and output filter capacitor configuration of the regulator system. In some examples, the amount of time is programmable based on a number of PWM pulses 136. In other words, the integrator will be placed in a low time constant mode until "N" number of PWM pulses occur.

In this example, the value of Rin 416 and the value of feedback capacitor 417 are both variable and the respective values are controlled by time constant (TC) control logic 422. In this example, TC control logic 422 is configured to be able to select from three different time constant values. A "steady state" TC value is used while the regulator system is operating in a steady state condition. When an undershoot condition is detected, an "increased" TC value is used. Then, a "decreased" TC value is used for a period of time after the undershoot condition is passed. In this example, for a steady state TC value equal to "TCss", an increased TC value can be 10×TCss and a decreased TC value can be TCss/4. In this example, TCss is 1 μs. In some examples, the amount of time for using a decreased TC value is programmable based on a number of PWM pulses 136. In other words, TC controller 422 will place the integrator 412 in a low time constant mode until "N" number of PWM pulses 136 occur. In other examples, the increased TC value should be at least 1.2 times TCss, while the decreased TC value should be less than 0.8 times TCss.

In this example, TC control logic 422 varies the value of input resistor 416 using a multiplexor technique to select between different resistor values. Similarly, a multiplexor technique is used to select between different capacitor values for feedback capacitor 417

Figure 5:
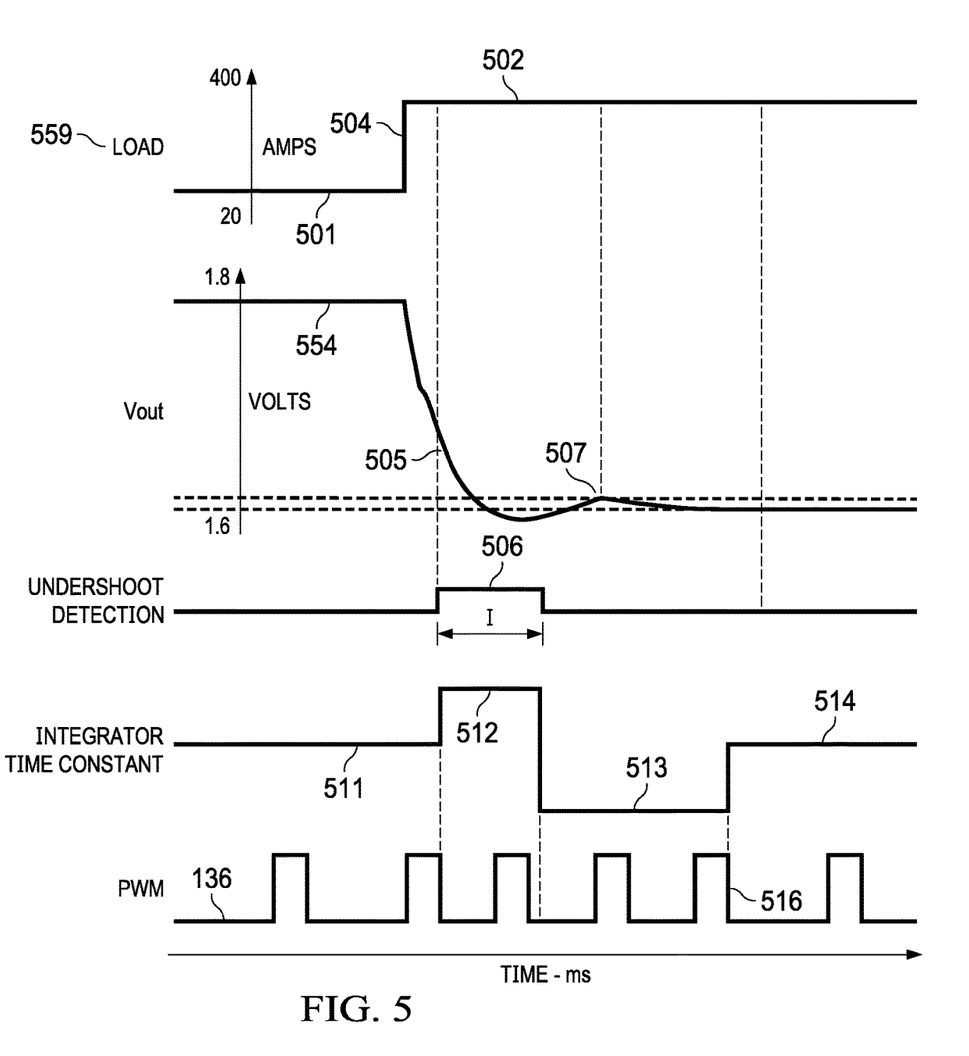
FIG. 5 is a plot illustrating undershoot detection and integrator time constant adjustment.

FIG. 5 is a set of plots illustrating undershoot detection and integrator time constant adjustment in PI control circuit 470 (FIG. 4). In this example, load current plot 559 is representative of load current 159 (FIG. 1) in which a variable load 158 (FIG. 1) causes the amount of current to transition from a first value indicated at 501 to a second value indicated at 502. In this example, load current value 501 is 25 amps, while load current 502 is 400 amps. Due to the rapid increase in load current 559 at 504, output voltage Vout 554 begins to drop, as shown at 505. Proportional path 401 (FIG. 4) of PI controller 470 (FIG. 4) then generates a large error signal Vprop (FIG. 4) that causes output voltage 559 to begin to increase, as indicated at 507.

During the drop in output voltage 554, undershoot detection logic 420 (FIG. 4) detects an undershoot condition 505, as indicated at time period 506 by comparing Vfb 175 (FIG. 4) to Vref 174 (FIG. 4). As described above, during the initial steady state period of operation as indicated at 511, the TC of integrator 412 is set to a steady-state TC value by TC control circuitry 422. In response to detection of an undershoot condition, TC control circuitry 422 changes the TC value to an increased TC value during time period 512 that corresponds to a duration of the undershoot condition. At the completion of the undershoot condition as indicated by undershoot detection logic 420, TC control circuitry 422 changes the TC value to a reduced TC value for a period of time indicated at 513. In this example, time period 513 is determined by a number (N) of PWM pulses 136 that occur after an undershoot condition is completed. In this case, N=two, as indicated at 516.

Figure 6:
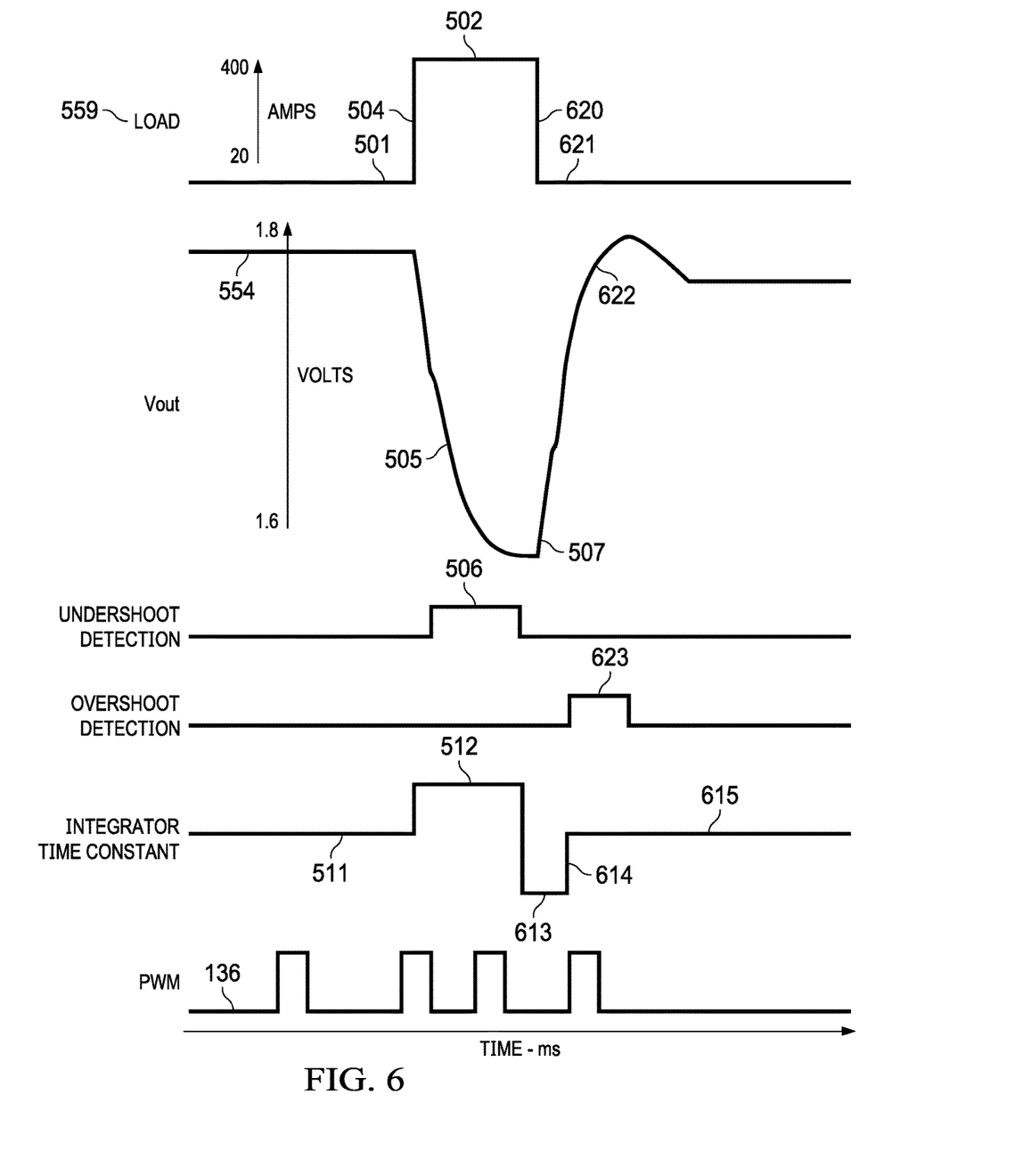
FIG. 6 is a plot illustrating overshoot detection and integrator time constant adjustment.

FIG. 6 is a set of plots illustrating overshoot detection and integrator time constant adjustment. In this example, load current plot 559 is representative of load current 159 (FIG. 1) in which a variable load 158 (FIG. 1) causes the amount of current to transition from a first value indicated at 501 to a second value indicated at 502. In this example, load current value 501 is 25 amps, while load current 502 is 400 amps. Due to the rapid increase in load current 559 at 504, output voltage Vout 554 begins to drop, as shown at 505. Proportional path 401 (FIG. 4) of PI controller 470 (FIG. 4) then generates a large error signal Vprop (FIG. 4) that causes output voltage 559 to begin to increase, as indicated at 507.

During the drop in output voltage 554, undershoot detection logic 420 (FIG. 4) detects an undershoot condition 505, as indicated at time period 506 by comparing Vfb 175 (FIG. 4) to Vref 174 (FIG. 4). As described above, during the initial steady state period of operation as indicated at 511, the TC of integrator path 402 is set to a steady-state TC value by TC control circuitry 422. In response to detection of an undershoot condition, TC control circuitry 422 changes the TC value to an increased TC value during time period 512 that corresponds to a duration of the undershoot condition. At the completion of the undershoot condition as indicated by undershoot detection logic 420, TC control circuitry 422 changes the TC value to a reduced TC value for a period of time indicated at 613.

In this example, variable load 158 is reduced after a short period of time, as indicated at 621, which is shorter than the period of time 513 (FIG. 5) for which the reduced TC value would normally be selected by TC control circuitry 422 (FIG. 4). In this example, the reduced TC value would normally be selected for a time period determined by a number (N) of PWM pulses 136 that occur after an undershoot condition is completed. In this case, N=two, as indicated at 516 (FIG. 5).

In this case, overshoot 622 occurs in response to the reduced load current value 621 at transition 620. Overshoot detection logic 421 (FIG. 4) detects an overshoot condition, as indicated at time period 623 by comparing Vfb 175 (FIG. 4) to Vref 174 (FIG. 4). In this case, it is not desirable to have the integrator absorb the overshoot error using a reduced TC value because the settling time will be increased. Therefore, in response to detecting an overshoot condition by overshoot detection logic 421, TC control logic 422 immediately selects the steady state TC value 615, as indicated at 614. In some examples, a higher TC value may be selected for a short period of time, such as a number M PWM modulated pulses. In one such example, M a value of three. In some examples, a higher TC value may be selected for a short period of time when the overshoot magnitude exceeds a threshold value. For example, an increased TC value that is 2-5 times the steady state TC may be used in this example.

Figure 7:
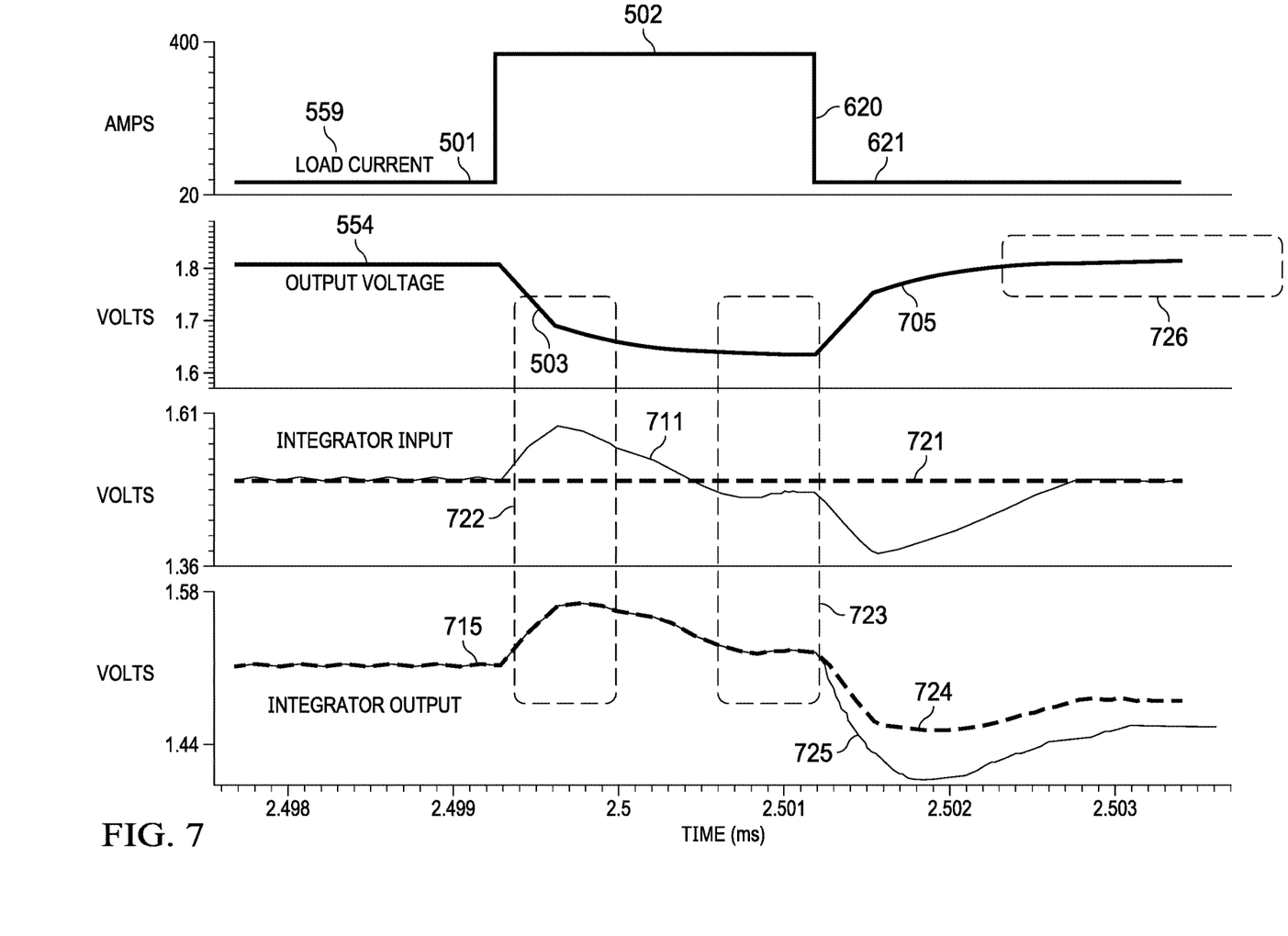
FIG. 7 is a plot illustrating operation of the example integrator circuit of FIG. 4.

FIG. 7 is a set of plots illustrating operation of the example integrator circuit 402 of FIG. 4 during a transient load condition in more detail. This example is similar to FIG. 6 in which a transient load is produced by variable load 158 (FIG. 1). In this simulation example, a 50 KHz load frequency with a 50% duty cycle is simulated.

In this example, during the initial high load current condition 502, the voltage error signal Verror 411 (FIG. 4) provided to the noninverting input 413 of integrator opamp 412 (FIG. 4) behaves as illustrated by plot line 711 in region 722. Integrator output signal Vint 415 (FIG. 4) behaves as illustrated by plot line 715 in region 722. During time period 722, proportional path 401 provides a majority of the control energy provided to LoopRaw signal 473 (FIG. 4). During period 722, the integrator path 402 can absorb a lot of error and drift even when it is not required to.

During period 723, the regulator output signal 154 is almost settled, as indicated by plot 554. Plot line 721 illustrates a steady state condition in which the error signal 411 represents an error of zero volts. Movement of integrator output 715 slows down as steady state is approached with the reduced TC value selected, as indicated at time period 613 (FIG. 6). As described above, a load release at this time as indicated at 620 can result in one or more extra PWM pulses and contribute to additional overshoot.

As described for FIG. 6, by increasing the TC value after detecting an overshoot 705, the magnitude of the overshoot is reduced in region 726. The increase in TC value causes the integrator output signal Vint 415 to be lower during the overshoot region, as indicated by plot line portion 725. Plot line portion 724 illustrates a higher Vint signal that would occur if a reduced TC value was maintained during the transient condition overshoot. In this example, overshoot is reduced from 25 mv to 20 mv in region 726 by selecting a higher TC value in response to detecting an overshoot. This is a 20% improvement.

Figure 8:
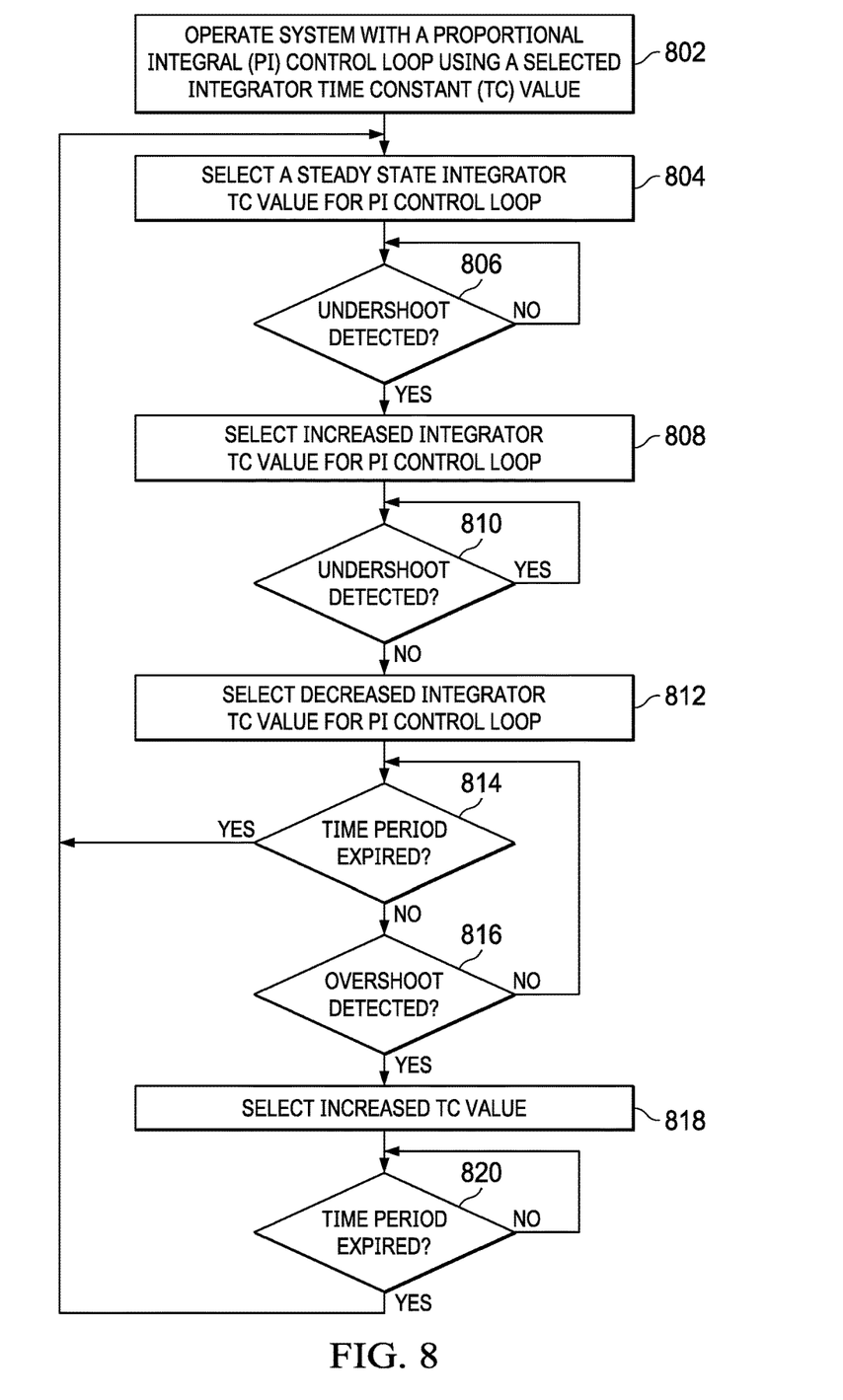
FIG. 8 is a flow diagram illustrating operation of an example feedback control system with a variable rate integrator.

FIG. 8 is a flow diagram illustrating operation of an example feedback control system with a variable rate integrator, such as example PI control circuit 470 (FIG. 4) that includes integrator circuit 402. PI circuit 470 is representative of PI circuit 170 (FIG. 1) and PI circuit 372 (FIG. 3). PI circuit 470 includes a proportional control block 401 and an integrating control block 402 that are coupled to a reference voltage signal Vref, a feedback voltage signal Vfb, and a voltage signal Vsum that is representative of a summation of current sense signals produced in the multiple phases of the switching circuitry, such as switching circuitry 150 in FIG. 1 and switching circuitry 350 in FIG. 3.

In described examples, integrator drifts are reduced by increasing the integrator time constant during an undershoot condition on feedback signal Vfb 175 detected by undershoot detection circuitry 420. Feedback signal 175 tracks Vout 154 (FIG. 1) or Vout 354 (FIG. 3). Then, the settling time from proportional path settling to the DC settling is reduced by decreasing the integrator time constant for a defined amount time. This time is based on the inductor and output filter capacitor configuration of the regulator system. In some examples, the amount of time is programmable based on a number of PWM pulses 136. In other words, the integrator will be placed in a low time constant mode until "N" number of PWM pulses occur.

At 802, a system such as regulator system 100 or other types of systems that include a feedback control system that use a PI or PID control loop is operated using a selected integrator time constant (TC).

At 804, a steady state integrator TC is selected for use in an integrator path of the PI/PID control loop. The value of the steady state integrator TC is chosen based on operating characteristic of the system. For example, in switching regulator system 100 (FIG. 1) the steady state integrator TC value is selected based on the size of switched inductors and filter capacitors used in the regulator system.

At 806, as long as an undershoot condition is not detected, the PI/PID continues to operate using the steady state integrator TC value.

At 808, when an undershoot condition is detected, then an increased integrator TC value is selected for use by the integrator path of the PI/PID.

At 810, the increased integrator TC value is used for the duration of the under-shoot condition. In another example, the increased integrator TC value may be used for a defined amount of time after detecting an undershoot condition.

At 812, after the undershoot condition is passed, then a decreased integrator TC value is selected for use by the integrator path of the PI/PID.

At 814, the decreased integrator TC value is used by the integrator path for a defined period of time. At the end of this defined period of time, a steady state integrator TC value is selected at 804.

At 816, if an overshoot is detected prior to the end of the defined decreased integrator TC value time period, then at 818 an increased integrator TC value is selected. This may be the same increased integrator TC value used at 808, or it may be a larger value. In another example, it may be larger, but not as large as the value used at 808.

At 820, the increased integrator TC value is used for a defined period of time. At the end of this defined period of time, a steady state integrator TC value is again selected at 804.

In a described example, the value of Rin 416 (FIG. 4) and the value of feedback capacitor 417 (FIG. 4) are both variable and the respective values are controlled by TC control logic 422 (FIG. 4). In this example, TC control logic 422 is configured to be able to select from three different time constant values. A "steady state" TC value is used while the regulator system is operating in a steady state condition. When an undershoot condition is detected, an "increased" TC value is used. Then, a "decreased" TC value is used for a period of time after the undershoot condition is passed.

Other Embodiments

In described examples, a PI and a PID controller are described. In another example, a simple integral only controller (I), may be constructed using a variable rate integrator as described herein.

In described examples, a multiphase switching power regulator is described. In another example, a single-phase switching power regulator is described. In other examples, various types of systems that utilize an I, PI or a PID controller to control an output value can reduce undershoot and overshoot of the output value by selecting different integrator TC values in response to detecting an undershoot or an overshoot condition.

In described examples, system circuitry that includes a switching regulator is controlled by PI controller that uses selectable integrator time constants. In another example, another type of system circuitry may be controlled by a PI controller that uses selectable integrator time constants. For example, the system circuitry may be process control logic for various types of processes, such as: controlling manufacturing machinery, electric motor speed control, flow control, temperature control, pressure control, level control, etc.

In described examples, a steady state, increased, and decreased integrator TC values are used. The value of each integrator TC value is determined based on the inductance and capacitance of the switching inductors and filter capacitors. In other example systems, integrator TC values may be selected based on the operating characteristics of a particular system in order to minimize undershoot and overshoot for that system.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. A method of operating a system having a proportional-integral control module, the method comprising:
   producing an error signal that is indicative of a difference between a reference signal and an output signal;
   producing a proportional control signal that is proportional to the error signal;
   producing an integral control signal by integrating the error signal using an integrator time constant value, wherein during a first period of time a first integrator time constant value is used;
   detecting an undershoot in the output signal and increasing the integrator time constant value to a second time constant value that is larger than the first integrator time constant value during a second time period after detecting the undershoot;
   reducing the integrator time constant value to a third integrator time constant value that is less than the first integrator time constant value during a third time period following the second time period; and
   adjusting the output signal in response to a combination of the proportional control signal and the integral control signal.

2. The method of claim 1, further comprising returning the integrator time constant value to the first time constant value after the third period of time.

3. The method of claim 1, further comprising detecting an overshoot in the output signal during the second period of time and increasing the integrator time constant value to a fourth time constant value that is larger than the second integrator time constant value for a fourth period of time.

4. The method of claim 1, wherein the second and third time periods have predefined lengths.

5. The method of claim 1, further comprising determining a length of time for the second time period to correspond to detecting an undershoot in the output signal.

6. The method of claim 1, further comprising initializing the second integrator time constant value with a selected value.

7. The method of claim 1, wherein increasing and reducing the integrator time constant value includes changing a capacitance value of a feedback capacitor in an integral control portion of the control module.

8. The method of claim 1, wherein increasing and reducing the integrator time constant value includes changing a resistance value of an input resistor in an integral control portion of the control module.

9. The method of claim 1, wherein the system is a buck converter, and wherein the output signal is a regulated voltage signal.

10. The method of claim 1, wherein the second time constant value is at least 1.2 times the first time constant value.

11. The method of claim 1, wherein the third time constant is less than 0.8 times?? the first time constant.

12. A system comprising:
   system circuitry having a control input and a system output;
   a proportional control module having a proportional output, the proportional output coupled to the control input; and
   an integral control module having a reference input, a feedback input, and an integral module output, the integral module output coupled to the control input, the integral control module comprising:
      an error detection circuit having inputs coupled to the reference input and to the feedback input respectively, and an error output;
      an integrator having first and second integrator inputs, and an integrator output, the first integrator input coupled the error output, the integrator output coupled to the integral module output, and the integrator configured to integrate a signal on the first integrator input using an integrator time constant (TC) value;
      undershoot detection logic having an input coupled to the feedback input, and having an undershoot output; and
      a TC control module having a TC control input and a TC output, the TC control input coupled to the undershoot output, and the TC output controllably coupled to the integrator to control the time constant value.

13. The system of claim 12, wherein the integrator comprises:
an opamp;
a feedback capacitor coupled between the integrator output and the second integrator input; and
a variable resistor having first and second resistor terminals, the first resistor terminal coupled to a voltage node, the second resistor terminal coupled to the second integrator input, wherein the variable resistor is controllably coupled to the TC output.

14. The system of claim 12, wherein the integrator comprises:
an opamp;
a variable feedback capacitor coupled between the integrator output and the second integrator input, wherein the variable feedback capacitor is controllably coupled to the TC output; and
a resistor having first and second resistor terminals, the first resistor terminal coupled to a voltage node, the second resistor terminal coupled to the second integrator input.

15. The system of claim 12, the integral control module further comprising overshoot detection logic having an input coupled to the feedback input, and having an overshoot output; and
the TC control module having a second TC control input coupled to the overshoot output.

16. The system of claim 12, wherein the system circuitry comprises:
pulse width modulation (PWM) circuitry having a PWM input and PWM outputs, the PWM input coupled to the control input;
buck converter circuitry having switch inputs and a voltage output, the switch inputs coupled to the PWM outputs, and the voltage output coupled the system output and to the feedback input.

17. The system of claim 16, wherein the buck converter circuitry is a multiphase buck converter.

18. A method of operating a feedback control module, the method comprising:
producing an error signal that is indicative of a difference between a reference signal and an output signal;
producing an integral control signal by integrating the error signal using an integrator time constant value, wherein during a first period of time a first integrator time constant value is used;
detecting an undershoot in the output signal and increasing the integrator time constant value to a second time constant value that is larger than the first integrator time constant value during a second time period after detecting the undershoot; and
adjusting the output signal in response to the integral control signal.

19. The method of claim 18, further comprising reducing the integrator time constant value to a third integrator time constant value that is less than the first integrator time constant value during a third time period following the second time period.

20. The method of claim 19, further comprising detecting an overshoot in the output signal during the second period of time and increasing the integrator time constant value to a fourth time constant value that is larger than the second integrator time constant value for a fourth period of time.

* * * * *